United States Patent [19]
Lastowski

[11] Patent Number: 5,449,140
[45] Date of Patent: Sep. 12, 1995

[54] MOBILE MOTOR DEVICE

[76] Inventor: Stanley M. Lastowski, P.O. Box 15005, Pensacola, Fla. 32514

[21] Appl. No.: 113,177

[22] Filed: Aug. 30, 1993

[51] Int. Cl.6 ............................................. F16M 13/00
[52] U.S. Cl. .................. 248/681; 180/298; 248/510; 248/558
[58] Field of Search .............. 248/681, 633, 558, 510, 248/503, 638; 180/294, 295, 298, 11; 56/16.7

[56] References Cited

U.S. PATENT DOCUMENTS

| | | | |
|---|---|---|---|
| 1,337,645 | 4/1920 | Doman | 248/633 |
| 2,041,654 | 5/1936 | Dame et al. | 56/16.7 |
| 3,035,806 | 5/1962 | Hamer et al. | 248/503 X |
| 3,165,163 | 1/1965 | Holka | 248/503 X |
| 3,651,883 | 3/1972 | Aldag | 248/503 X |
| 3,863,291 | 2/1975 | Woelffer . | |
| 4,217,708 | 8/1980 | Prenatt et al. . | |
| 4,306,331 | 12/1981 | Chernosky . | |
| 4,343,139 | 8/1982 | Lowry et al. | 56/17.5 X |
| 4,389,836 | 6/1983 | Lowry et al. | 56/12.7 |
| 4,597,203 | 7/1986 | Middleton . | |
| 4,688,376 | 8/1987 | Wolfe, Sr. | 56/16.7 |
| 4,756,147 | 7/1988 | Savell . | |
| 5,070,685 | 12/1991 | Galt | 56/16.7 |

FOREIGN PATENT DOCUMENTS 767092  1/1957  United Kingdom ................ 180/298

Primary Examiner—Karen J. Chotkowski
Attorney, Agent, or Firm—Carnes, Cona, and Dixon

[57] ABSTRACT

A mobile motor device is provided to be used interchangeably with motorless equipment shells. The mobile motor device includes a carrying handle, an universal motor, a support plate, and a latch for attaching to a motorless equipment shell. The motorless equipment shell is provided with a device to receive the latch and to prove stability to the mobile motor device.

21 Claims, 9 Drawing Sheets

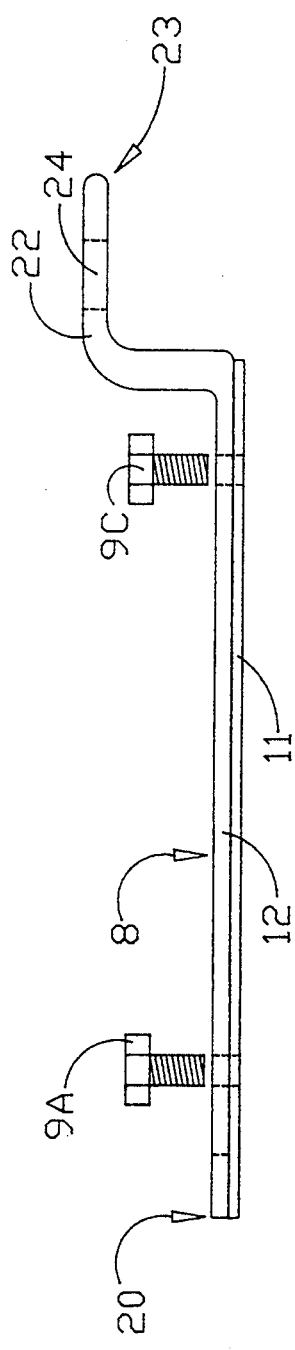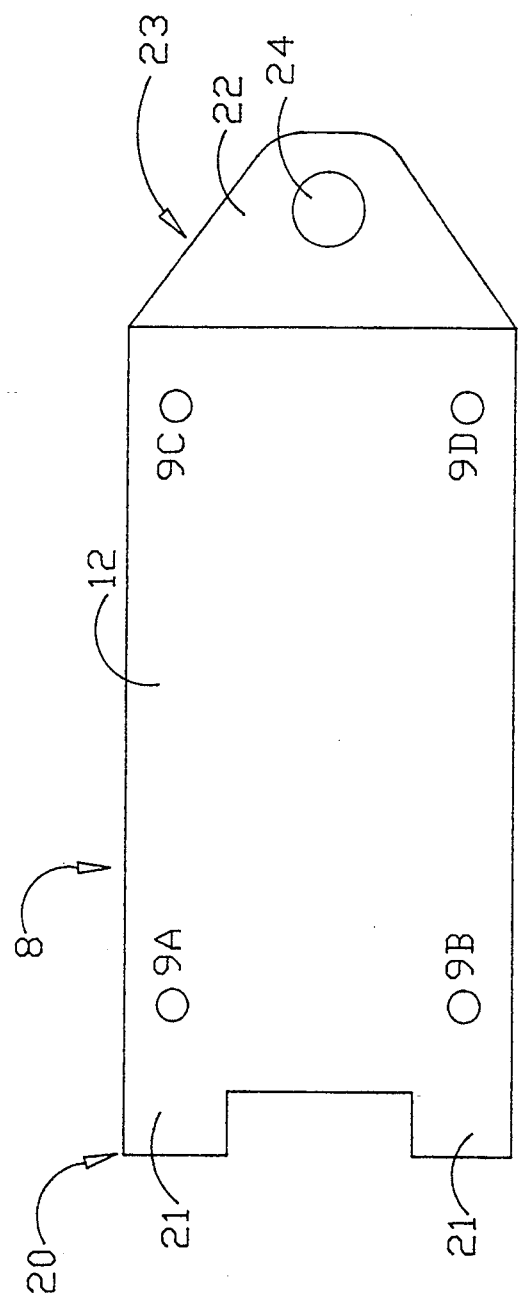
FIG. 2A
FIG. 2B

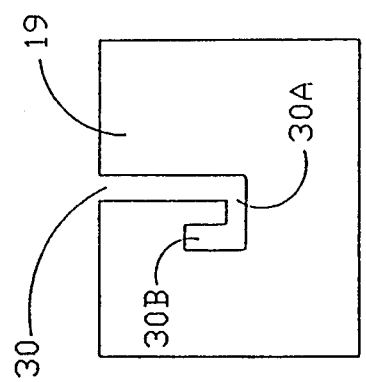
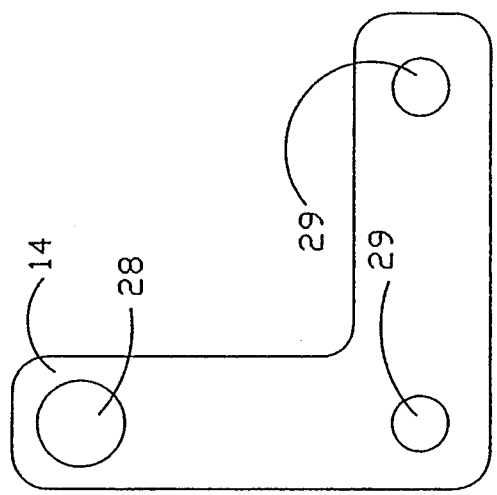
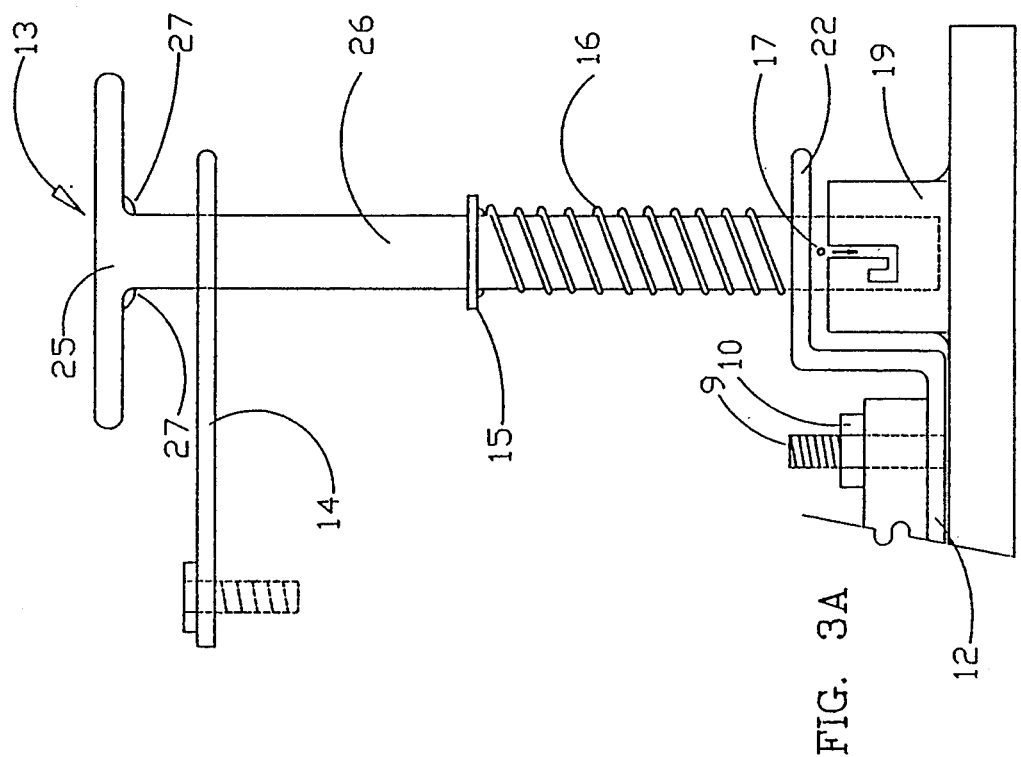

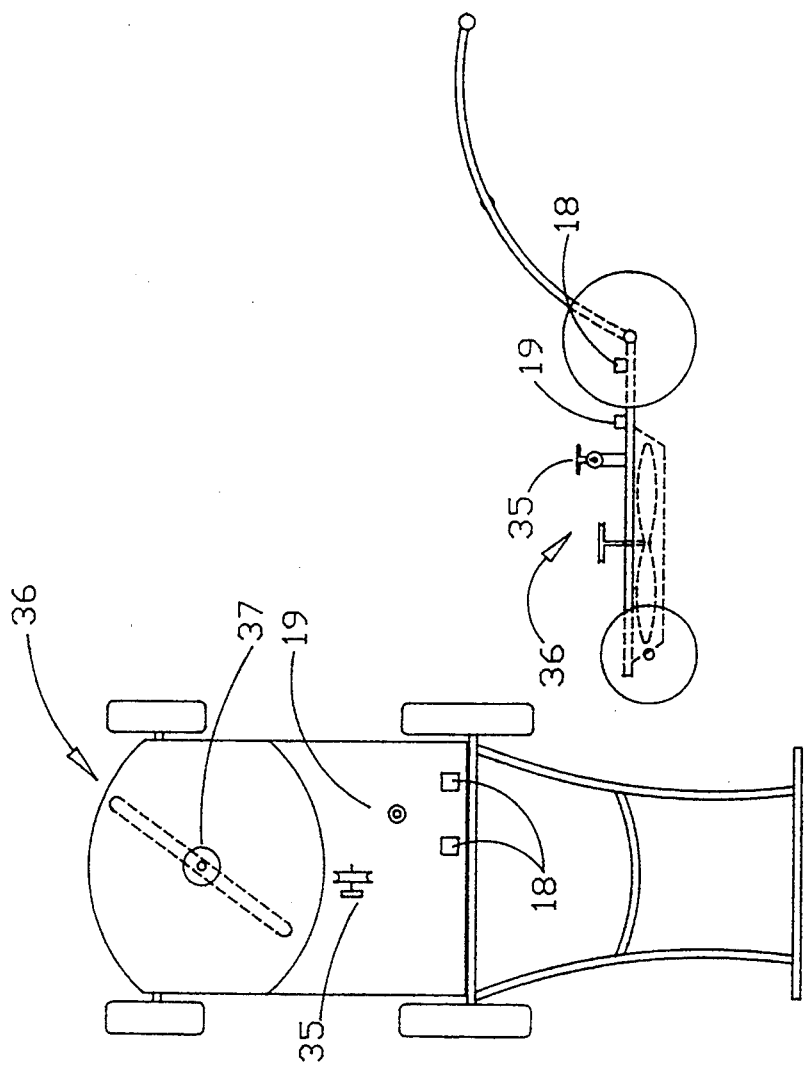
FIG. 6A
FIG. 6B
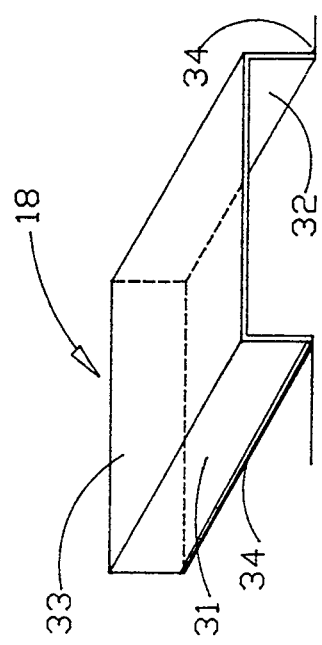
FIG. 5

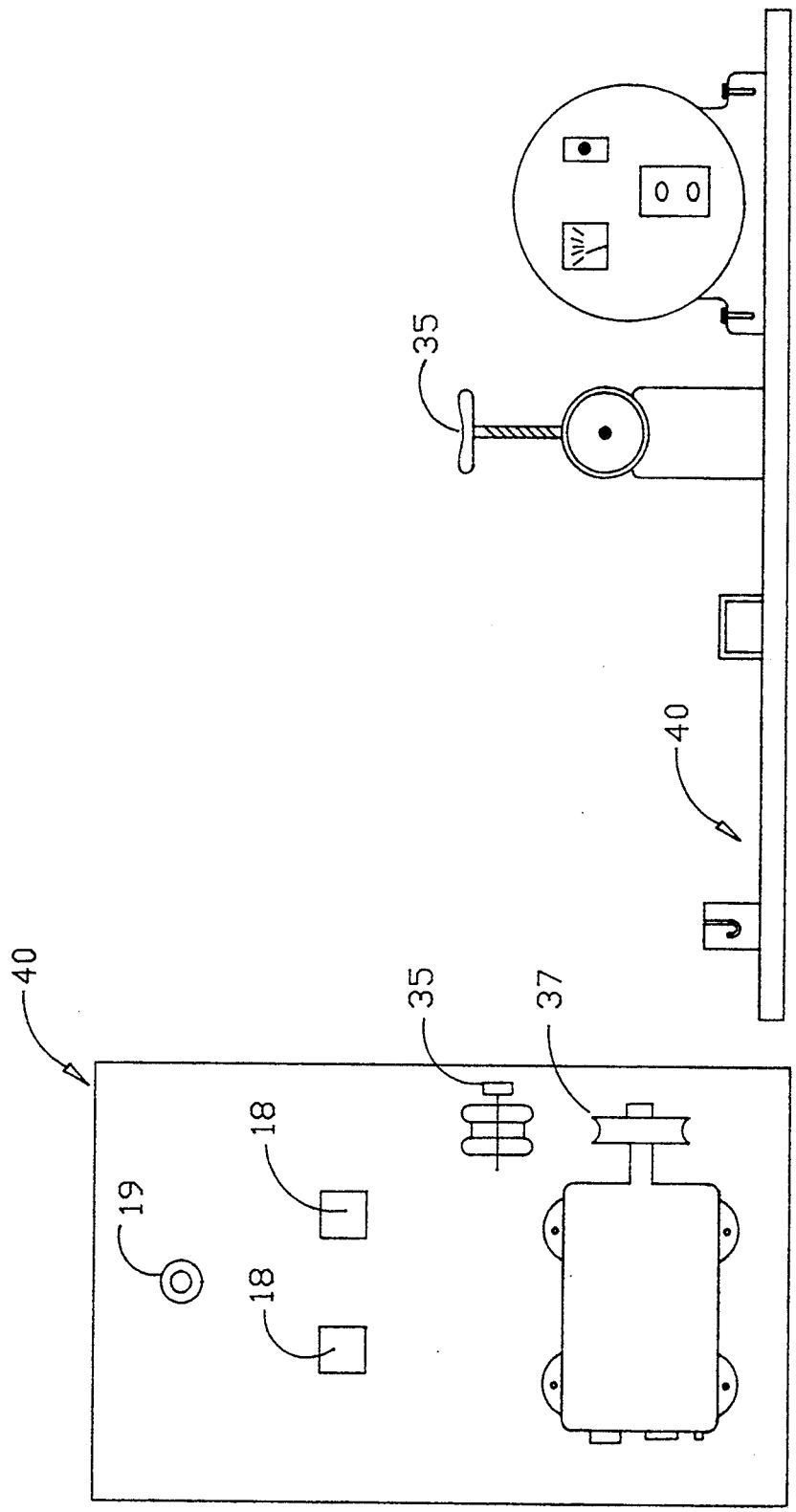

MOBILE MOTOR DEVICE

BACKGROUND OF THE INVENTION

Several types of motor implements that are utilized domestically are powered by small gasoline engines. These motor implements can include a large number of devices such as push or riding lawn motors, generators, water pumps, rotor tillers, and marine engines for boats. Purchasing a multitude of these devices individually is expensive, with the main cost component being the gasoline engine.

Therefore, in order to minimize the costs associated with the purchase of a number of these motor implements, the need to utilize several gasoline engines, one engine for each implement, must be eliminated. A device is needed whereby a single gasoline engine can be employed in a variety of implements to perform a variety of tasks.

Toward this end, many devices have been proposed. One such device, U.S. Pat. No. 3,863,291 issued to Woelffer, is a convertible device. This device transforms an existing motor implement into a different motor implement. For example, a push lawn mower is converted into an air blower. Although this device reduces the need for one engine in the domestic motor tool arsenal, its range of applications is very restricted. Applications beyond this restricted range require the purchase of further gasoline engines.

DESCRIPTION OF THE PRIOR ART

U.S. Pat. No. 3,863,291 issued to Woelffer discloses a rotary lawnmower that is convertible to an air blower.

U.S. Pat. No. 4,217,708 issued to Harlan and Mark Prenatt discloses a snow remover which is convertible to a lawn mower.

U.S. Pat. No. 4,306,331 issued to Chernosky discloses a lawn mower to which a baffle can be attached to convert the mower to a vacuum cleaner.

U.S. Pat. No. 4,597,203 issued to Middleton discloses a snow blower unit powered by an engine. Attachments are available to convert the snow blower to a lawnmower, vacuum and bagger, leaf picker, edger, rotary tiller, leaf blower, sprayer, electric generator, hydraulic pump, and air compressor.

U.S. Pat. No. 4,756,147 issued to Savell discloses a weed trimmer that has a carriage that permits converting the trimmer to a lawn mower.

Another device, U.S. Pat. No. 4,597,203 issued to Middleton, permits an existing motor implement to be converted to other motor implements by using various attachments. Specifically, this device consists of a snow blower having several types of attachments permitting the snow blower to change into a lawn mower, water pump, or generator. This device cannot however be utilized for larger motor implements, such as marine engines. Furthermore, this device suffers from the same malady as the above described device in that its range of applications is restricted.

The present invention overcomes the above shortcomings and includes a number of unique and advantageous features. The present invention consists of a portable motor that can be utilized in a multitude of applications. The applications can consist of any device that requires the use of a small gasoline engine. As the need for a new application is identified, an application shell toward that end is constructed.

The benefits of such a device are immediately obvious. The user need only make a one-time investment for a major cost item—the gasoline engine. Thereafter, the user need only purchase application shells to perform the desired tasks as the need for each application arises. As the engineless shells will cost much less then their engine-laden counterparts, the cost savings to the user who has a need for several such applications will be substantial. Additionally, the user of the present invention will be required to service and maintain only one engine, not several.

The present invention is constructed so that the time required to transfer the mobile motor device from one application shell to another is approximately one minute.

It is the object of the present invention to provide for a mobile motor device that can be used interchangeably with motorless equipment shells.

It is another object of the present invention to provide a cost efficient apparatus.

It is another object of the present invention to provide for a mobile motor device that is easily and quickly installed into the application shells.

SUMMARY OF THE INVENTION

This invention provides for a mobile motor device to be readily interchanged between various motorless equipment shells. An universal motor, a carrying handle, a connecting latch, a supporting plate, and a power driving member constitute a mobile motor device.

The motorless equipment shell can consist of several types of tool implements, such as push or riding lawn mowers, edgers, rotor tillers, water pumps, generators, air compressors, log splitters, wood chippers, shredders, or boats, or any equipment operated with a horizontal shaft motor.

A receiver and a stabilizing box are attached to the motorless equipment shells. The supporting plate of the mobile motor device slides into the stabilizing box, the connecting latch is secured to the receiver and power is transferred from the motor device to the tool implement by means of a pulley drive belt system.

The cost is greatly reduced by utilizing one universal motor for several motorless equipment shells.

BRIEF DESCRIPTION OF THE DRAWING

FIG. 2A is an enlarged detailed side view of the mobile motor engine plate on the mobile motor device.

FIG. 2B is an enlarged detailed planar view of the mobile motor engine plate on the mobile motor device.

FIG. 3A is an enlarged detailed side view of the T-bar on the mobile motor device.

FIG. 3B is an enlarged detailed planar view of the stabilizing bracket for the T-bar.

FIG. 4 is an enlarged detailed side view of the receiver located on the motorless equipment shell.

FIG. 5 is an enlarged detailed isometric view of the stabilizing box located on the motorless equipment shell.

FIGS. 6A and 6B illustrate the motorless lawn mower shell.

FIGS. 9A and 9B illustrate the motorless generator shell.

DESCRIPTION OF THE PREFERRED EMBODIMENTS

Figure 1:
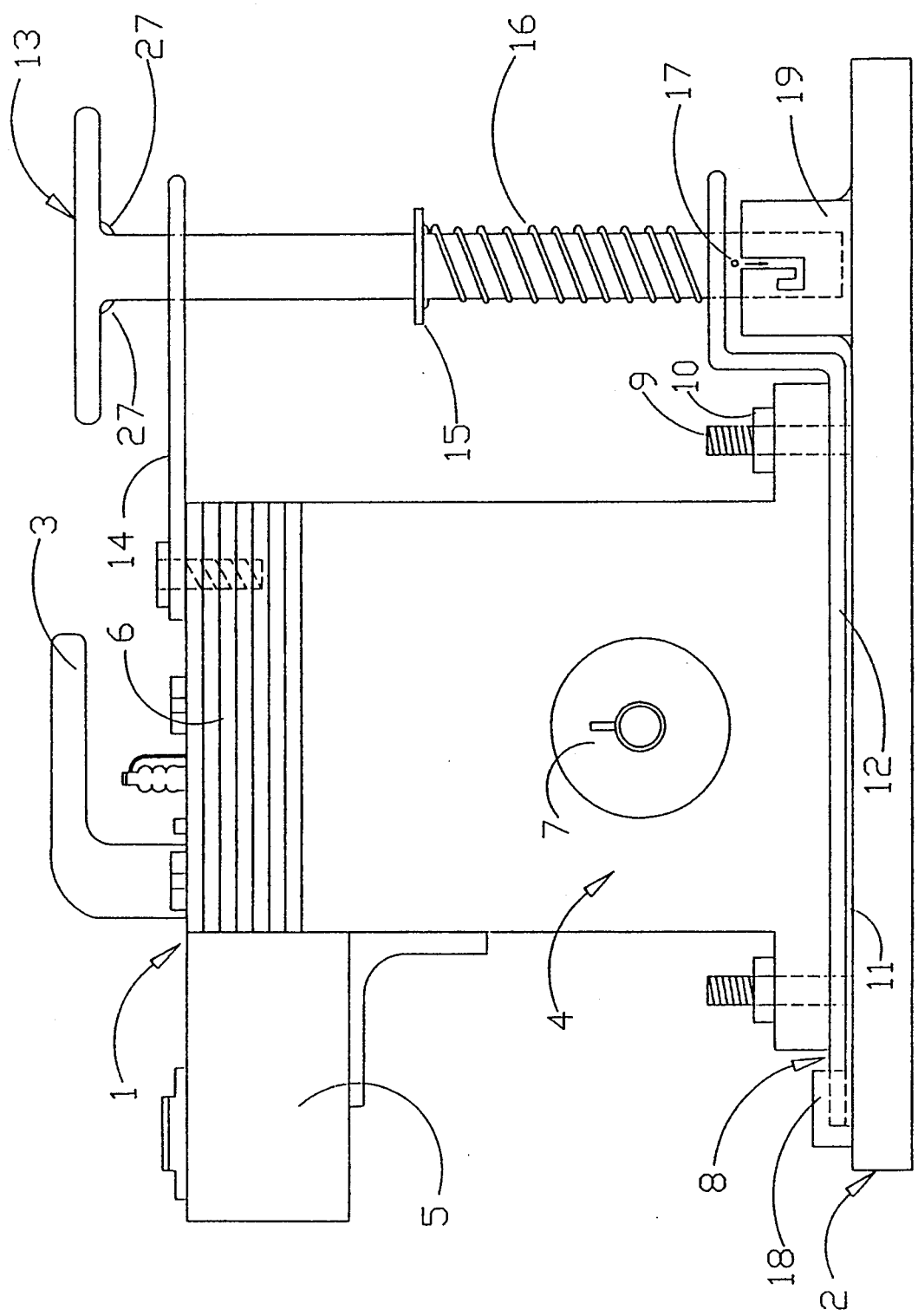
FIG. 1 is a cross-sectional view of a mobile motor device attached to a motorless equipment shell.

Embodiments of the present invention will now be described below with reference to the accompanying drawings in which like numerals designate like parts throughout the several views. FIG. 1 depicts the mobile motor device 1 attached to a motorless equipment shell 2. A handle 3 is attached to the mobile motor device to provide for a means to carry the device from one motorless equipment shell to another motorless equipment shell. The mobile motor device 1 consists of an universal motor 4 having a fuel tank 5, heat sink 6, and pulley 7 which is a power driving member. Power is transferred from the motor device to the motorless equipment shell by a pulley drive belt system (the belt, the pulley on the motorless equipment shell and the tension means are not shown in this figure). The universal motor 4 is attached to a motor plate 8 by threaded studs 9 and nuts 10. The motor plate has an isolator pad 11 and carbon steel plate 12. Being made of rubber, the isolator pad 11 dampens the vibrations created by the universal motor 4 during operation.

A T-bar 13 is used to attach and detach the mobile motor device 1 to the motorless equipment shell 2. The T-bar 13 is guided by stabilizing bracket 14, which allows for translational and rotational motion along the T-bar's longitudinal axis. The T-bar 13 also includes a washer spring 16 and a pin 17.

The motorless equipment shell 2 consists of stabilizing boxes 18 and a receiver 19, a pulley 37, and tension means 35. (See e.g. FIGS. 6A and 6B).

FIG. 2A is an enlarged detailed side view of the mobile motor plate 8 and. FIG. 2B is an enlarged detailed planar view of the mobile motor plate 8. The mobile motor plate 8 has an isolator pad 11. A ¾ inch thick carbon steel plate 12 is located on the isolator pad 11. Motor plate 8 has a first end 20 and a second end 23.

Located on the steel plate are four threaded studs, 9A, 9B, 9C, and 9D. A distance of 6⅜ inches separate stud 9A from stud 9C and stud 9B from stud 9D. A distance of 3⅛ inches separates stud 9A from stud 9B and stud 9C from stud 9D.

First end 20 of the steel plate 12 is 5½ inches wide. At the top and bottom portions of end 20 are two flanges, 21. Flanges 21 each have a length of ¾ of an inch and a width of 1 inch.

At second end 23, at a distance of ¾ of an inch from the center of studs 9B and 9C, the steel plate 12 extends upwards and then outwards, forming a flange 22. The height from the bottom of the steel plate 12 to the top of flange 22 is 2 inches. The length of flange 22 is 2½ inches. At a distance of 1 inch from end 23 of flange 22 is the middle of an aperture 24. Aperture 24 has a diameter of 9/16 of an inch. Flange 22 is also illustrated in FIG. 3A.

FIG. 3A is an enlarged detailed side view of the T-bar 13. The T-bar has handle 25 having a length of 4 inches and a height of ⅜ of an inch. This handle 25 is welded to bar 26 at location 27. Approximately 14 inches from handle 25 is a washer 15 welded to bar 26. Located between flange 22 of steel plate 12 and washer 15 is a spring 16. A pin 17 is attached on the T-bar 13, below flange 22.

The bracket 14, as illustrated in FIG. 3B, is 3/16 of an inch thick and has a width of 1 inch. Aperture 28, having a diameter of 11/16 inches, is for guiding the motions of the T-bar 13. Apertures 29, each having a diameter of ⅜ of an inch, are for receiving bolts for securing the bracket to the mobile motor device (not illustrated in this figure but shown in FIG. 1).

FIG. 4 is an enlarged detailed side view of the receiver unit of the motorless equipment shell 2. The receiver unit is welded to the motorless equipment shell 2. It has a height of 1¾ inches and a diameter of ¾ of an inch. A cut out portion 30, forms a J-shape channel having a diameter of ¼ of an inch. This cut out portion acts as a guiding channel which receives the pin 17 of the T-bar 13.

FIG. 5 is an enlarged detailed isometric view of the stabilizing box 18. The stabilizing box 18 is an inverted C-channel. The C-channel has two flanges 31 and 32, and a web 33. The flanges have a length of ¾ of an inch and a height of ¼ of an inch. The web has a length of 1 inch and a width of ¾ of an inch. The flanges and web are ⅛ of an inch thick. The stabilizing box is welded to the equipment at portions 34.

Figures 7A, 7B:
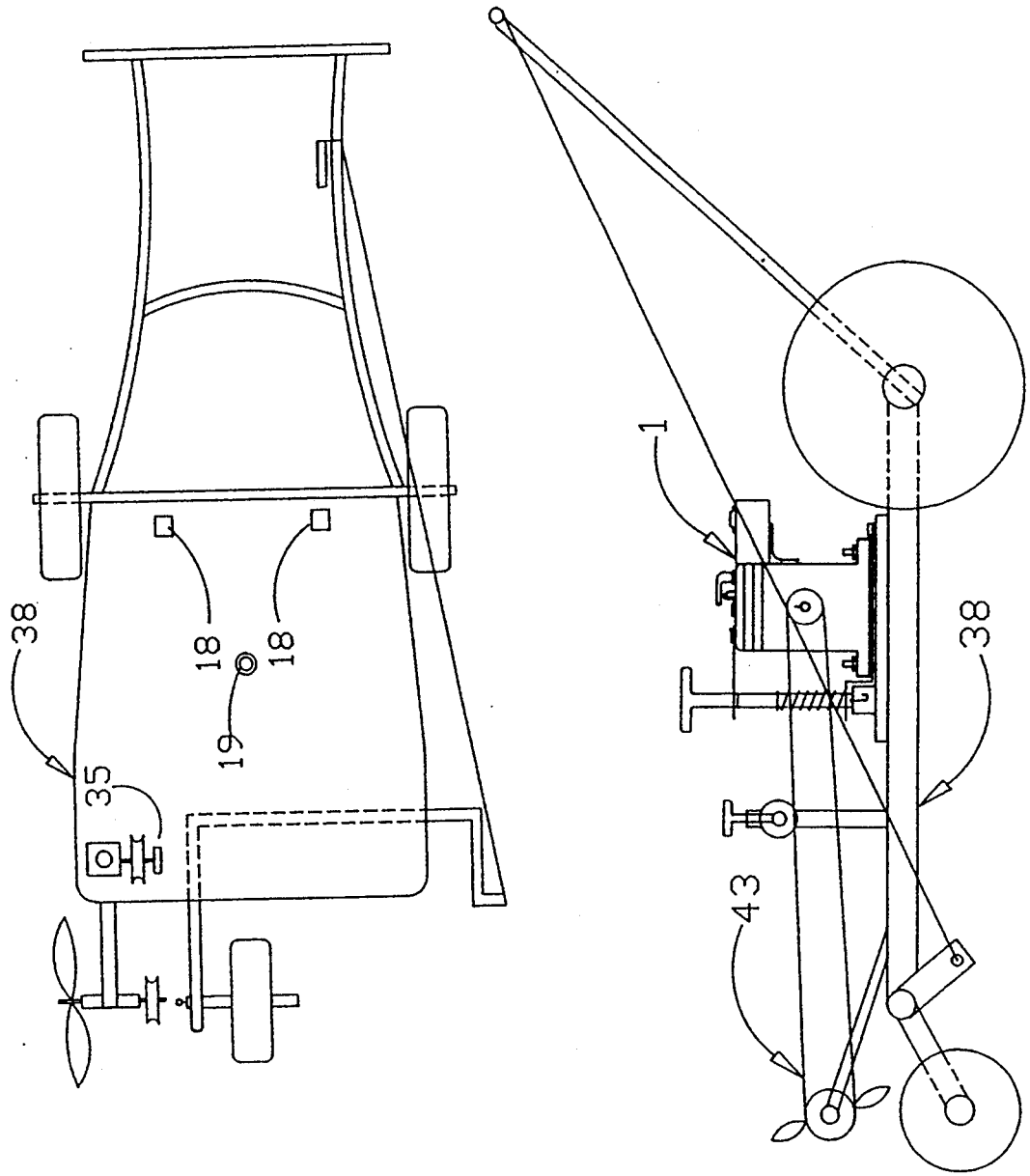
FIG. 7A illustrates the mobile motor device mounted on a sidewalk edger shell.
FIG. 7B illustrates the motorless sidewalk edger shell.
Figure 8A:
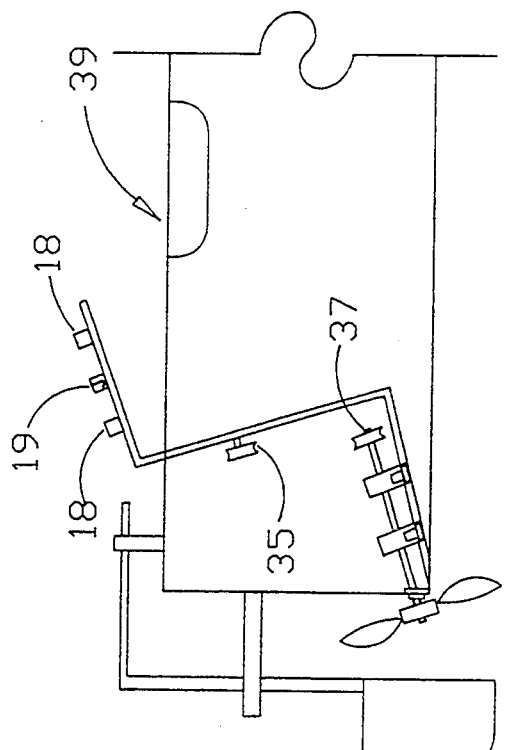
FIGS. 8A and 8B illustrate the motorless boat shell.
Figure 8B:
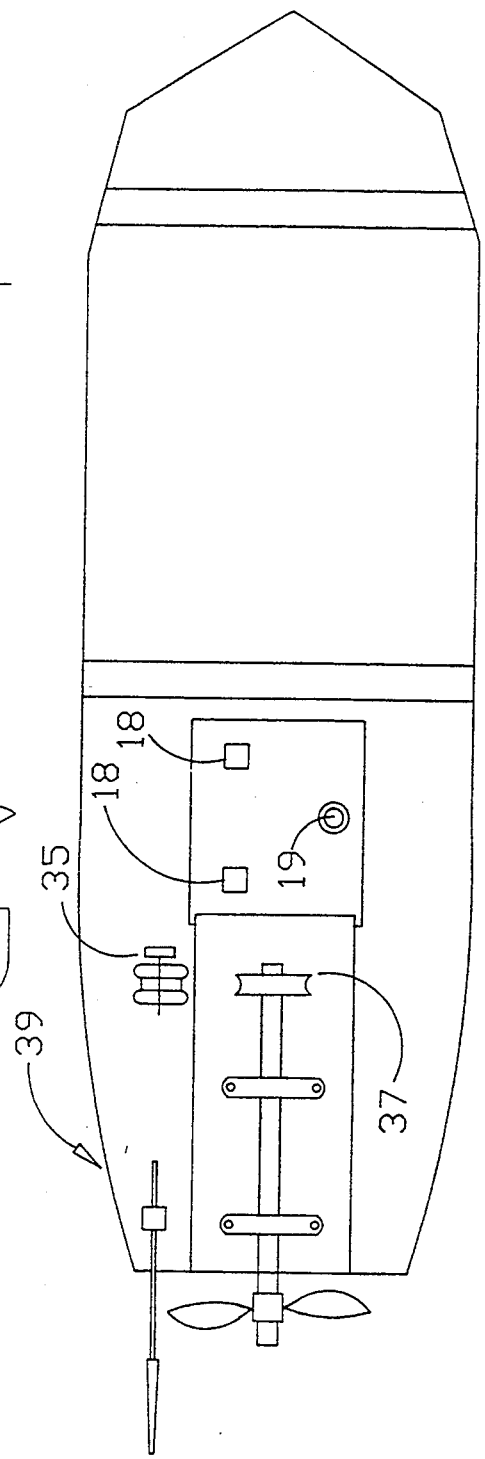
Figure 10B:
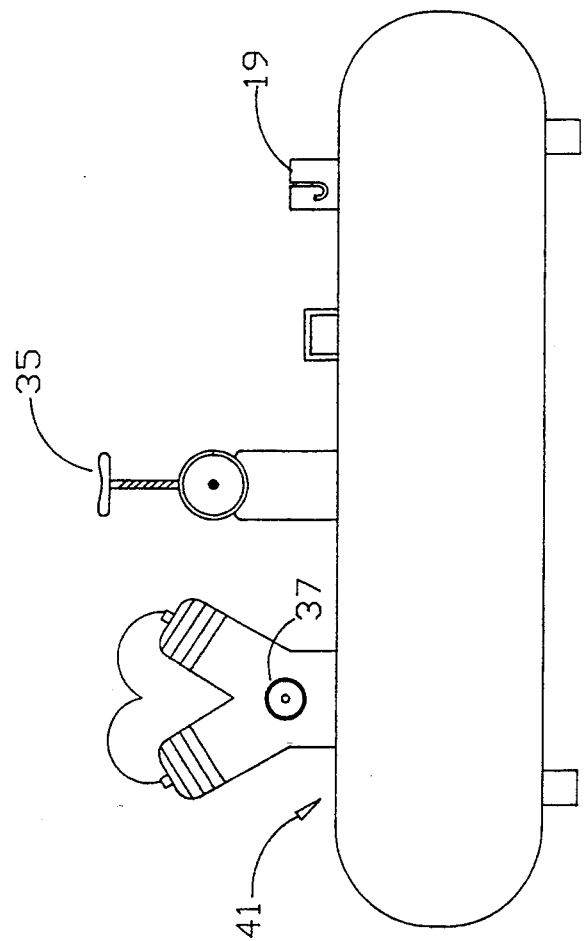
FIGS. 10A and 10B illustrate the motorless compressor shell.
Figure 10A:
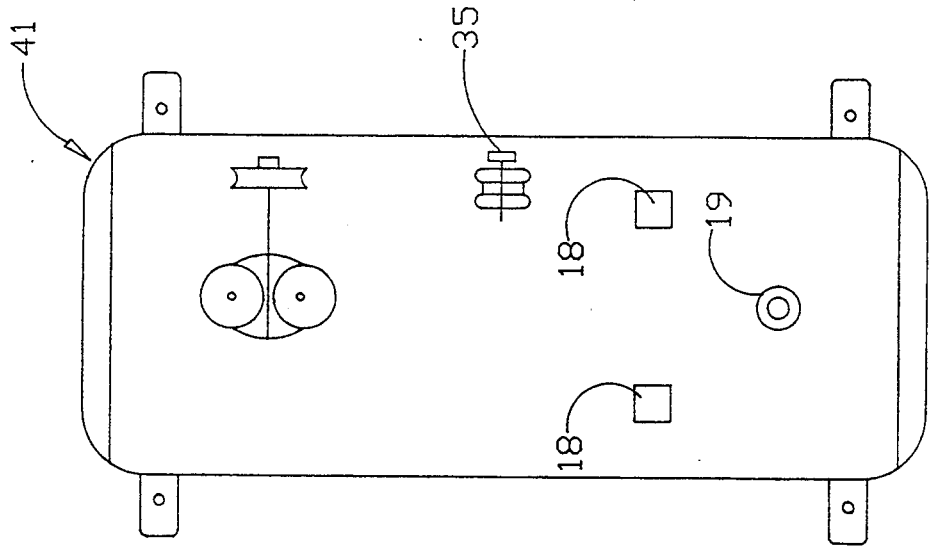
Figures 11A, 11B:
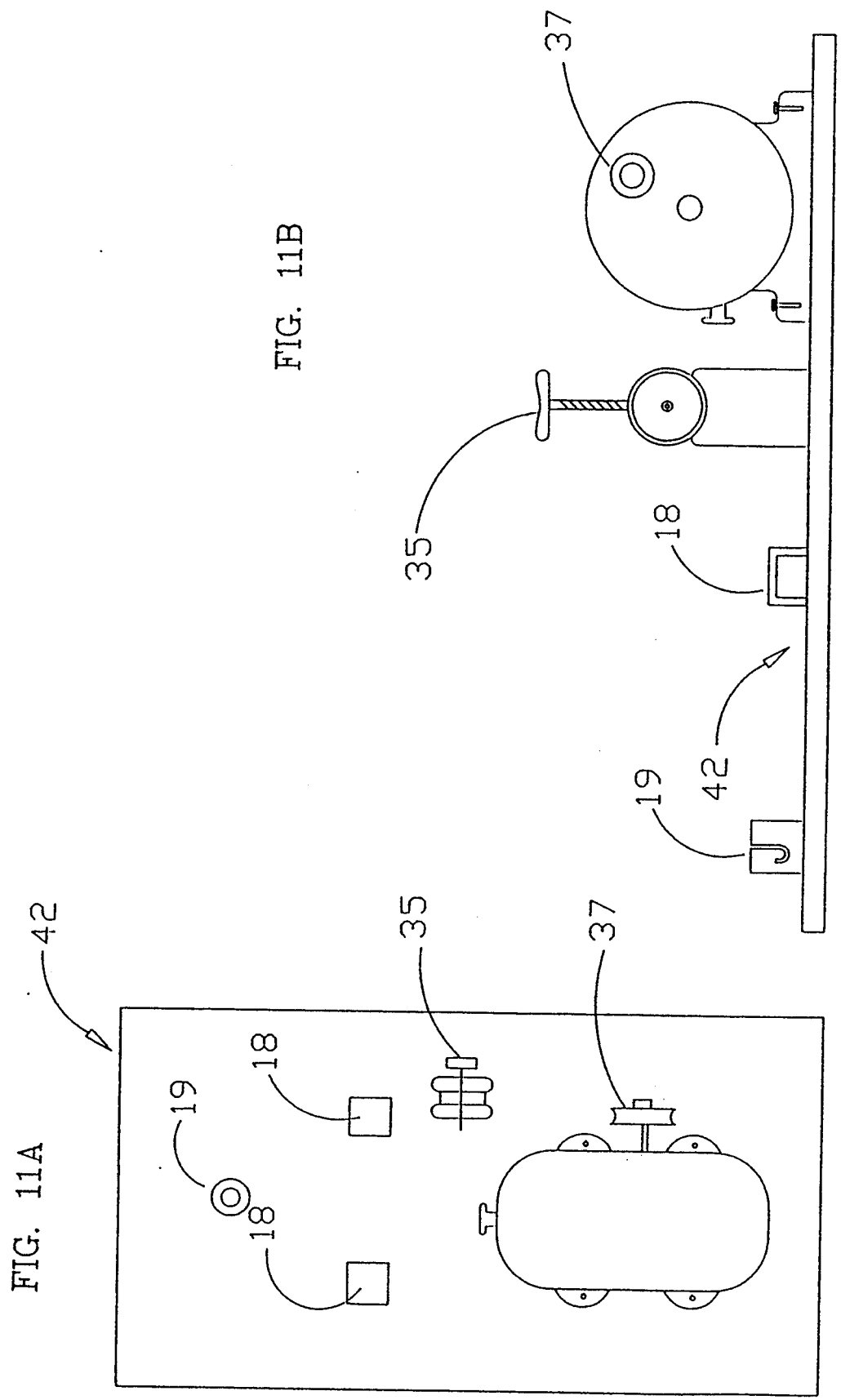
FIGS. 11A and 11B illustrate the motorless water pump shell.

FIGS. 6A, 6B, 7B and 8A–11B all illustrate various embodiments of a motorless equipment shell. In all of these figures, there is a receiver 19, two stabilizing boxes 18 and tension means 35. FIGS. 6A and 6B illustrate a motorless push lawn mower shell 36, having a pulley 37 and tension means 35. FIG. 7B illustrates a motorless sidewalk edger shell 38, having a pulley 37, and tension means 35. FIGS. 8A, 8B, and 8C illustrate a motorless boat shell 39 having a pulley 37, and tension means 35. FIGS. 9A and 9B illustrate a motorless generator shell 40. FIGS. 10A and 10B illustrate a motorless air compressor shell 41. FIG. 11A and 11B illustrate a motorless water pump shell 42.

FIG. 7A illustrates a mobile motor device 1 attached to a motorless sidewalk edger shell 38. Power is transferred from the mobile motor device 1 to the motorless sidewalk shell by a pulley drive belt system 43.

In order to secure the mobile motor device 1 to a motorless equipment shell 2, the mobile motor 1 is positioned so that flanges 21 are slid into stabilizing boxes 18 located on the motorless equipment shell 2. At this point pin 17 is located just above cutout portion 30 of receiver unit 19. The user pushes down on handle 25 so that pin 17 is inserted into cutout portion 30 of receiver unit 19. When pin 17 reaches the horizontal portion 30A of cutout portion 30 the user twists handle 25 so that pin 17 traverses the entire length of portion 30A and reaches end portion 30B. Thereafter the user releases handle 25. Spring 16, being contracted, causes an upward force on washer 15 which in turn causes an upward force on bar 26. This causes pin 17 to be displaced into end portion 30B and rest in a locked position. Residual forces exist, causing an effective preload which resists motion of the pin 17 thereby ensuring stability of the T-bar 13.

A pulley belt 43 is connected between the mobile motor device pulley 7 and the motorless equipment shell pulley 37. The pulley belt 43 transfers power from the mobile motor device 1 to the motorless equipment shell 2. Appropriate tension is retained on the pulley belt 43 by tension means 35.

While the invention has been particularly shown and described with reference to an embodiment thereof, it will be understood by those skilled in the art, that various changes in form and detail may be made without departing from the spirit and scope of the invention.

I claim:

1. A motor apparatus comprising in combination:
   a mobile motor device;
     said mobile motor device comprising a motor, a support plate affixed to a bottom surface of said motor, and a latching means is attached to a first side of said motor for providing said latching means to be perpendicular to said support plate by an attaching means;
   a carrying means affixed to said mobile motor device;
   a fuel tank affixed to said motor;
   a motorless equipment shell;
   a receiving means attached to said motorless equipment shell for receiving said latching means of said mobile motor device;
     said latching means provides for said mobile motor device to be removably secured to said motorless equipment shell via a singular translational and rotational motion;
   a stabilizing means attached to said motorless equipment shell for receiving, maintaining, and stabilizing said mobile motor device to said motorless equipment shell; and
   said stabilizing means includes an inverted C-channel for receiving an end of said support plate.

2. The motor apparatus as in claim 1 wherein said support plate comprises an isolator layer and a metal layer located on said isolator layer, and said metal plate communicates with said motor.

3. The motor apparatus as in claim 2 wherein said metal plate is carbon steel.

4. The motor apparatus as in claim 2 wherein said isolater layer is rubber.

5. The motor apparatus as in claim 2 wherein said metal plate includes a first bent portion at 90 degrees upwards which is located at a first end of said metal plate, and a first flange which extends outwardly and away from said mobile motor device is attached to said first bent portion, and said first flange has an aperture for receiving said latching means.

6. The motor apparatus as in claim 5 wherein said latching means comprises a handle, an elongated cylinder affixed to said handle, a washer affixed to said elongated cylinder, said first flange of said metal plate is located under said washer, a pin is located under said first flange and affixed to said elongated cylinder, a spring is located between said first flange and said washer, and said receiving means on said motorless equipment shell comprises a J-shaped channel for receiving said pin on said latching means, and said spring, said elongated cylinder, said pin, and said aperture provides for said singular translational and rotational motion.

7. The motor apparatus as in claim 5 wherein said attaching means being a bracket, said bracket having a first aperture and a set of second apertures, said first aperture is for receiving said elongated cylinder of said latching means and said second apertures are for receiving bolts to secure said bracket to said mobile motor device.

8. The motor apparatus as in claim 1 wherein said support plate is attached to said motor by threaded stubs.

9. The motor device as in claim 1 wherein said motorless equipment shell is a motorless push lawn mower shell.

10. The motor device as in claim 1 wherein said motorless equipment shell is a motorless sidewalk edger shell.

11. The motor device as in claim 1 wherein said motorless equipment shell is a motorless boat shell.

12. The motor device as in claim 1 wherein said motorless equipment shell is a motorless generator shell.

13. The motor device as in claim 1 wherein said motorless equipment shell is a motorless compressor shell.

14. The motor device as in claim 1 wherein said motorless equipment shell is a motorless water pump shell.

15. A motor apparatus comprising in combination:
   a mobile motor device;
     said mobile motor device comprising a motor, a support plate affixed to a bottom surface of said motor, and a latching means is attached to a first side of said motor for providing said latching means to be perpendicular to said support plate of said motor by an attaching means;
   a carrying means affixed to said mobile motor device;
   a fuel tank affixed to said motor;
   a motorless equipment shell;
   a receiving means attached to said motorless equipment shell for receiving said latching means of said mobile motor device;
   a stabilizing means attached to said motorless equipment shell for stabilizing said mobile motor device to said motorless equipment shell; and
   said stabilizing means comprises an inverted C-channel which receives a first end of said support plate.

16. The motor apparatus as in claim 15 wherein at a second end of said support plate, a first flange extends outwardly and away from said mobile motor device and said first flange has an aperture for receiving said latching means.

17. The motor apparatus as in claim 16 wherein said latching means comprises a handle, an elongated cylinder affixed to said handle, a washer affixed to said elongated cylinder, said first flange of said metal plate located under said washer, a pin located under said first flange and affixed to said elongated cylinder, a spring located between said first flange and said washer and said receiving means on said motorless equipment shell comprises a J-shape channel for receiving said pin on said latching means.

18. A motor apparatus as in claim 15 wherein said support plate comprises an isolator layer and a metal plate located on said isolator layer, and said metal plate communicates with said motor.

19. A motor apparatus comprising in combination:
   a mobile motor device;
     said mobile motor device comprising a motor that is affixed to a top surface of a support plate, and a latching means attached perpendicularly to a first end of said support plate;
     said support plate further includes a metal layer that communicates with said motor and an insulating isolator layer is secured to said metal layer;
   a flange extends outwardly from a second end of said support plate;
   a motorless equipment shell;
     said latching means provides for said mobile motor device to be removably secured to said motorless equipment shell and said insulating isolator layer communicates with a top surface of said motorless equipment shell when said mobile motor device is secured to said motorless equipment shell;

said latching means provides for said mobile motor device to be removably secured to said motorless equipment shell via a singular translational and rotational motion;

a receiving means is attached to said motorless equipment shell for receiving said latching means of said mobile motor device;

a channel is attached to said motorless equipment shell; and said channel is adapted to receive said flange of said support plate for stabilizing said mobile motor device to said motorless equipment shell.

20. A motor apparatus as in claim 19 wherein said latching means includes a handle that is affixed to an elongated cylinder, a washer is affixed to said elongated cylinder, said cylinder extends through an aperture that is located at said first end of said support plate, a spring is located on said elongated cylinder and said spring is located between said washer and said aperture, a pin is located under said aperture on said elongated cylinder, and said receiving means on said motorless equipment shell comprises a J-shape channel for receiving said pin on said latching means.

21. A motor apparatus as in claim 19 wherein said motorless equipment shell is selected from a group consisting of a motorless push lawn mower shell, a motorless sidewalk edger shell, a motorless boat shell, a motorless generator shell, a motorless compressor shell, or a motorless water pump shell.

* * * * *